Aug. 31, 1965
H. C. HARBKE
3,203,201
SLIP JOINT FOR A MECHANICAL DRIVE
Filed Feb. 25, 1963
3 Sheets-Sheet 1
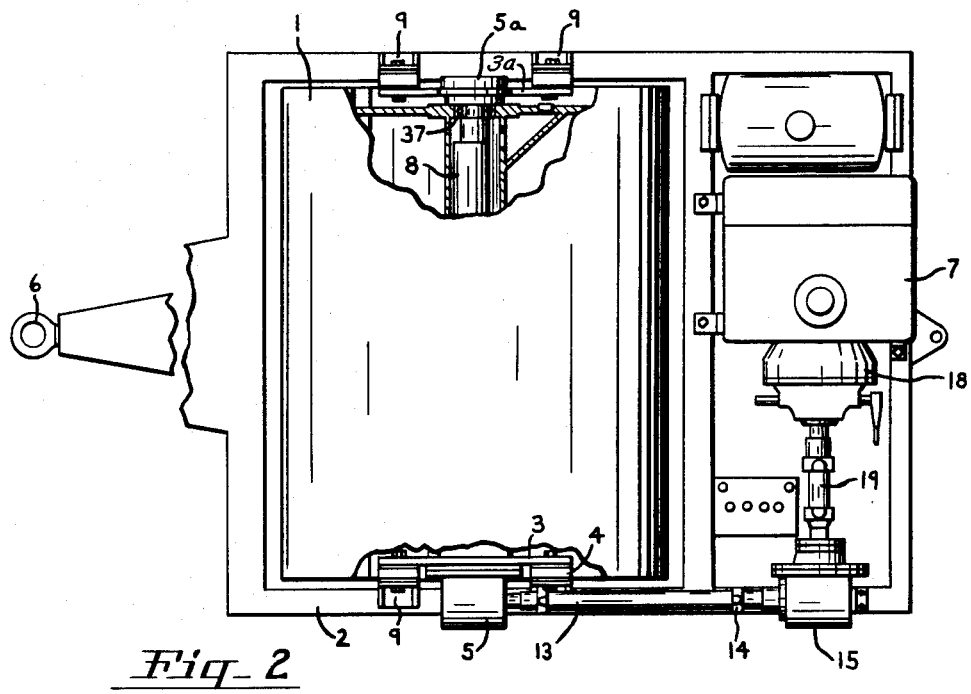
*Fig_2*
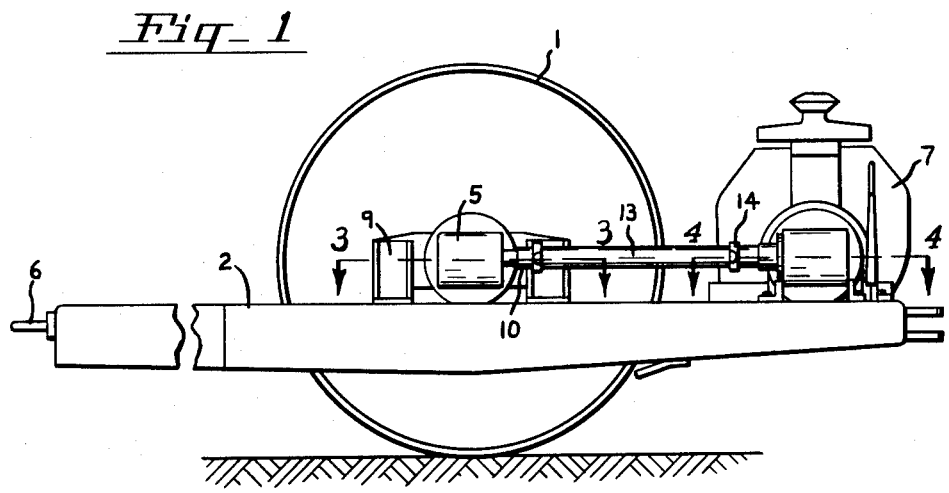
*Fig_1*
INVENTOR.
HARLAND C. HARBKE
BY
BUCKHORN, BLORE, KLARQUIST AND SPARKMAN
*Attorneys*

Aug. 31, 1965   H. C. HARBKE   3,203,201
SLIP JOINT FOR A MECHANICAL DRIVE
Filed Feb. 25, 1963   3 Sheets-Sheet 2
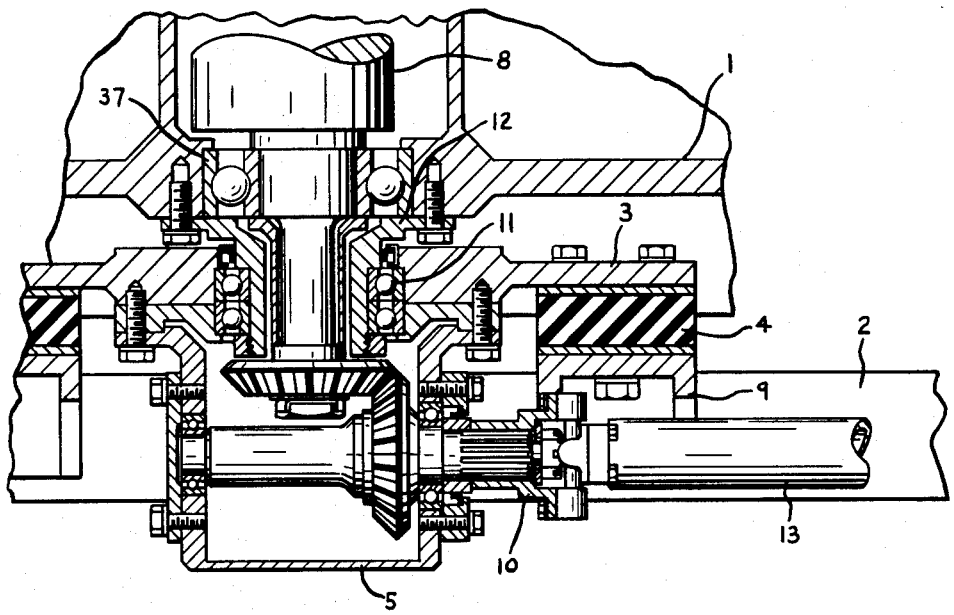
Fig_3
Fig_4
INVENTOR.
HARLAND C. HARBKE
BY
BUCKHORN, BLORE, KLARQUIST AND SPARKMAN
*Attorneys*

Aug. 31, 1965         H. C. HARBKE         3,203,201
SLIP JOINT FOR A MECHANICAL DRIVE
Filed Feb. 25, 1963         3 Sheets-Sheet 3
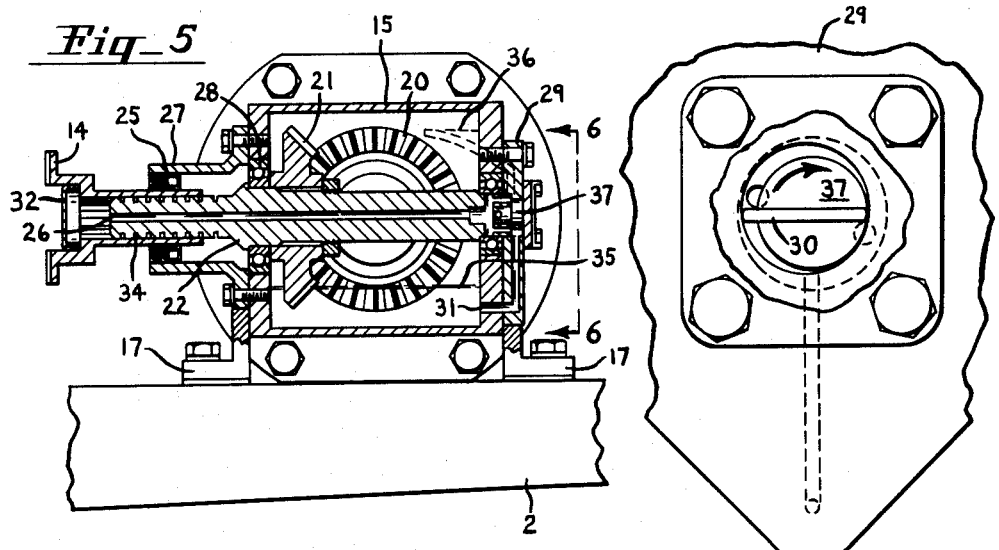
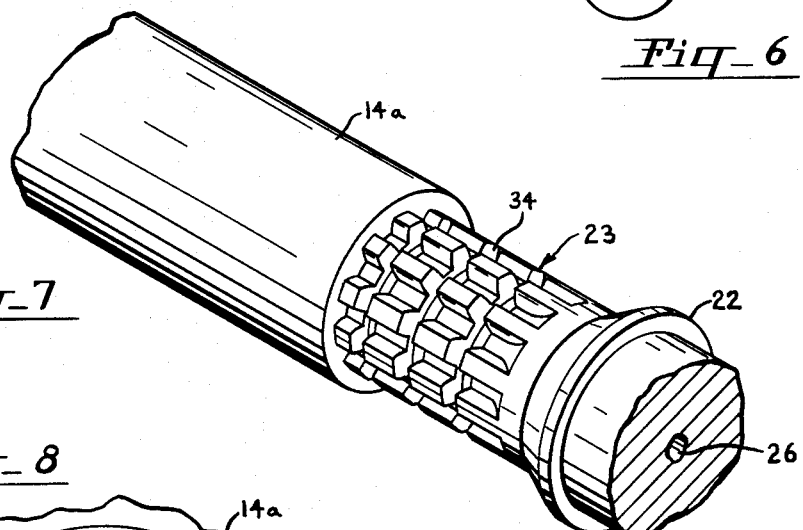
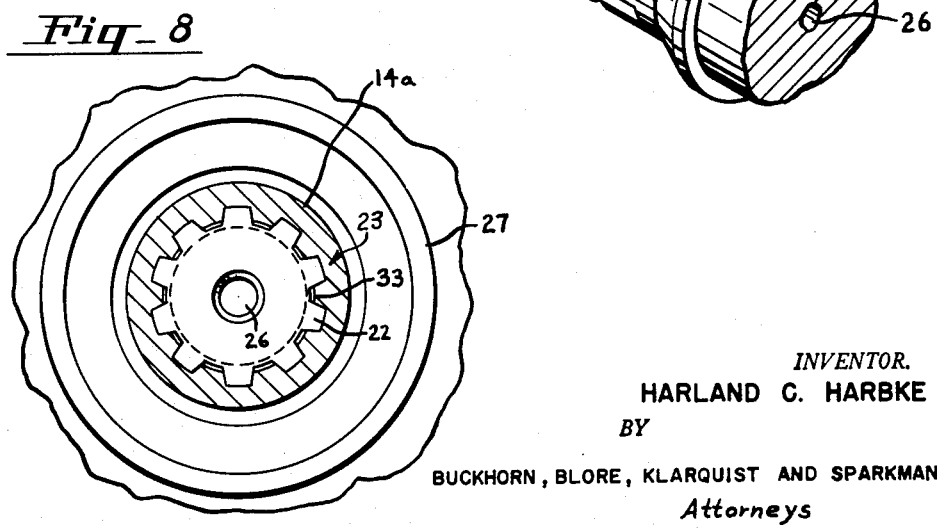
INVENTOR.
HARLAND C. HARBKE
BY
BUCKHORN, BLORE, KLARQUIST AND SPARKMAN
*Attorneys*

United States Patent Office
3,203,201
Patented Aug. 31, 1965

3,203,201
SLIP JOINT FOR A MECHANICAL DRIVE
Harland C. Harbke, Portland, Oreg., assignor to Hyster Company, Portland, Oreg., a corporation of Nevada
Filed Feb. 25, 1963, Ser. No. 260,644
8 Claims. (Cl. 64—23)

This invention relates to a slip joint for a mechanical drive for a vibration inducing mechanism for general application but particularly for use on a vibratory compacter.

Vibratory compacters of this general form provide a roller wheel in contact with the ground, caused to vibrate by an engine driving an eccentric shaft within the wheel. Compacters of this class are generally towed over the soil to be compacted. The engine is mounted to a rigid frame which in turn is mounted on and supported by the wheel through a vibration isolating device which tends to reduce the vibration set up in the frame and engine. Such isolation is necessary primarily to prevent damage to the engine and components. In devices of this kind, trouble has always been experienced in the drive between the engine and the vibrating wheel. Usually, V-belts form the final connection between the wheel which is subjected to vibration and the frame which is isolated from vibration but such belts are difficult to adjust and are short lived and generally unsatisfactory. Mechanical drives have been tried heretofore without success for reasons which will be discussed.

It is the main object of the present invention to provide a mechanical drive which will have the flexibility of belts but will not have the disadvantages of belts and will have a useful life comparable to the life of other elements in the machine.

Another object of the invention is to provide a mechanical drive which will allow a high frequency longitudinal slip while at the same time providing a positive torsional connection.

Another object of the invention is to provide a positive lubrication system for the slip-connection so as to insure a long life of the components of the connection.

Various objects of the present invention will be apparent from the following description taken in connection with the accompanying drawings, wherein:

FIG. 1 is a side view in elevation of the complete compacter with the tongue broken out to conserve space;

FIG. 2 is a plan view of the machine shown in FIG. 1, with certain parts of the wheel broken out to show inner details;

FIG. 3 is a sectional plan view of the final drive mechanism showing the eccentric shaft, one frame support bearing, one set of vibration isolaters and the final drive mechanism of the eccentric shaft;

FIG. 4 is a sectional plan view of the primary right angle drive for the vibrator;

FIG. 5 is a sectional view of the primary drive of FIG. 4 taken along line 5—5 of FIG. 4;

FIG. 6 is an enlarged fragmentary view of the end of the primary drive housing taken along line 6—6 of FIG. 5;

FIG. 7 is an enlarged perspective view of the slip joint shown in FIGS. 4 and 5; and FIG. 8 is an enlarged cross section of the slip joint taken on line 8—8 of FIG. 4.

Referring to FIGS. 1 and 2, wheel 1 is in contact with the ground and supports frame 2 through the medium of plates 3 and 3a, isolaters 4 and bearing housings 5 and 5a. The entire compacter is propelled over the ground by a tractor (not shown) attached to the tongue at 6. Wheel 1 is caused to vibrate at a high frequency by engine 7, the drive mechanism shortly to be discussed, and eccentric shaft 8 which is mounted at the center of the wheel.

The rotating mass of shaft 8 is not concentric with the axis of rotation so it is apparent that, as the shaft rotates at high speed, dynamic forces will cause entire wheel 1 to vibrate and thus impart vibratory forces directly to the soil for the purpose of compacting the soil.

The amplitude of vibration in the typical example disclosed is in the order of 3/16 inch in all directions from center but it is undesirable to allow the entire compacter, including frame and engine to vibrate through such an amplitude because this vibration would be destructive to both the engine and the frame. To isolate the frame and the engine which is attached thereto from this destructive vibration, conventional rubber "sandwiches" 4 are mounted between plates 3 and 3a which are attached to the wheel through appropriate bearings and brackets 9 which are rigidly attached to frame 2. Thus, when the wheel vibrates, the frame and its associated parts need not follow the full amplitude of this vibration, and it will be prevented from doing so by its own inertia. It will be noted from FIG. 3 that the final right angle drive housing and all its components including input universal joint 10, is rigidly mounted to plate 3. Plate 3 in turn is supported by bearings 11 on hollow wheel stud 12 which, in turn, is rigidly mounted to wheel 1. Thus, as wheel 1 vibrates, this vibration is transmitted in full amplitude to universal joint 10.

Universal joint 10 is driven by hollow shaft 13, the other end of which is supported and driven by universal joint 14. Universal joint 14 is radially located by drive shaft 22 on which it is mounted. Drive shaft 22 is mounted in housing 15 which in turn is rigidly attached to the frame by brackets 17. It is thus apparent that as housing 5 vibrates in all directions in a vertical plane, the universal joint drive shaft must accommodate extreme variations in both angle and length. It will be recognized that the general construction of this shaft assembly is the same as is commonly used on automobiles but conventional automobile propeller shafts, even of considerably larger size than would normally be required, proved entirely inadequate in this application because of the extremely high frequency of movement. The automobile propeller shaft needs to adjust each time the frame moves with respect to the wheels but this is infrequent as compared to the adjustments required of the shaft of this subject invention which runs constantly at a frequency in the order of 2,000 cycles per minute. I have found that the conventional universal joint as used here can tolerate the angular displacement required of it without undue wear, but the slip joint of the conventional drive shaft repeatedly failed for lack of lubrication in test periods as short as nine hours.

FIGS. 4, 5, 7 and 8 show the novel slip joint design which overcomes this difficulty as discussed in detail below.

Rotary power from engine 7 passes through conventional clutch 18 and conventional universal joint assembly 19 to bevel gear 20, which drives bevel gear 21 which is keyed to shaft 22 which has a special spline shown generally at 23. Mounted on spline 23 for sliding movement is extended hub 14a of universal joint 14. As pointed out in some detail above, universal joint 14 moves back and forth on its axis at about 2,000 cycles per minute through an amplitude in the order of 3/8 of an inch. Because of this constant sliding under full torsional load, spline 23 on the driving shaft and the internal spline on driven hub 14 must be lubricated. Various types of conventional lubrication including partial or complete immersion in lubricant proved unsatisfactory as follows:

(A) Grease as applied by a pressure type lube fitting wipes off in a few minutes.

(B) When the housing 27 containing the shaft is filled with oil, the high frequency in-and-out movement of hub extension 14a effectively pumps lubricant out of the housing in spite of oil seals 25 which normally are adequate to prevent leakage.

Thus, I find it is advisable to mount the spline connection in a "dry housing" and supply oil to it by the continuous circulation means to be described.

To assure a dry condition in spline housing 27, I maintain an oil level in housing 15 below shaft 22 so that oil which enters housing 27 through the spline will drain back into housing 15 through bearing 28.

Oil to lubricate the spline is supplied by a conventional vane type pump incorporated into shaft 22 and cover 29 as most clearly shown in FIGS. 5 and 6. Vane 30 is driven by the shaft in an eccentric bore machined into bearing retainer 29. The intake port for this pump is shown at 31 below the normal dynamic oil level of housing 15. The discharge ports of the pump are drilled into the shaft so that they connect with oil hole 26. Thus, as the shaft revolves, oil from housing 15 is pumped under pressure out the splined end of the shaft. Cap 32 prevents the oil from escaping the hub so it is forced to escape through the spline in a manner specifically provided for. Any other form of pump would accomplish the same result. The in-and-out movement of hub 14 on shaft 22 also contributes to the pumping action so positive escape for the oil through the spline must be provided or the oscillatory movement of the hub on the shaft would be impeded with serious result.

As an optional source of oil pressure, I provide a trough shown dotted at 36 which catches oil splashed from the gears and delivers it by gravity to the end of shaft 22. I find, however, that a positive pump is preferred because this allows a lower oil level in the housing and thus prevents loss of oil through seal 25.

In any spline with no perceptible back lash, the peripheral clearance between the male and female splines cannot be of sufficient magnitude to accommodate the flow of oil required. All standard splines provide radial clearance at the roots of either the male splines or the female splines. FIG. 8 shows this clearance 33 at the root of the male splines. I take advantage of this clearance as a longitudinal oil passage in each spline but find that even under forced circulation, the oil does not adequately lubricate the splines under the conditions described. As an additional means of lubricating the splines, I provide a series of circumferential grooves as shown at 34 to allow the oil to circulate around the shaft as well as longitudinally along the shaft. Grooves 34 may be cut to a depth below the root of the male splines as shown clearly in FIGS. 7 and 8 so that the flow of oil around the grooves will not be cut off or materially impeded by the mating splines as they pass across the grooves. In certain cases, the root clearance will be sufficient to make it unnecessary to cut the circumferential grooves below the root depth.

The relation between the size of the passages and the quantity of oil pumped through them is somewhat critical because I want sufficient back pressure to develop to cause the circumferential grooves to be filled at all times. However, I find that centrifugal force has a tendency to keep these grooves full of oil even if the back pressure might be less than optimum.

Grooves 34 are preferably spaced apart a distance less than the minimum axial travel of hub 14 over the shaft. Thus, any given point on the continuous spline will pass beyond the end of an adjacent land on the mating spline at some time during each cycle, and be exposed to the fresh oil in an adjacent groove.

I find that when these conditions are attained, or even approximated, no part of either a female or male spline will be scraped completely dry and thus, adequate lubrication has been attained for the first time in a coupling of this kind.

It will be apparent that precisely the same effect could be obtained if grooves 34 were cut in the external member 14a instead of on the internal shaft 22. The only advantage of cutting the grooves on the shaft is to reduce the cost of machining.

Having described the invention in what is considered to be the preferred embodiment thereof, it is desired that it be understood that the invention is not to be limited other than by the provisions of the following claims.

I claim:

1. In a slip joint for a rotary drive,
a pair of elongated inner and outer splined members sliding one inside the other with splines interlocked,
radial clearance at the roots of the splines of at least one of said members,
and a series of peripheral grooves in one of said members,
the depth of said grooves at least equalling the root depth of the splines,
said grooves being so spaced that the length of the lands between the grooves is less than a predetermined minimum extent of axial differential movement of the said members.

2. In a slip joint for a rotary drive,
a pair of elongated inner and outer splined members sliding one inside the other with splines interlocked,
radial clearance at the roots of the splines of at least one of said members,
and a series of peripheral grooves in one of said members,
continuous splines on the other of said members the depth of said grooves at least equalling the root depth of the splines,
said grooves being so spaced that the length of the lands between the grooves is less than a predetermined minimum extent of axial differential movement of the said members in cycles so that any given point on a said continuous spline will enter at least one of said grooves at every cycle of axial movement.

3. In a slip joint for a rotary drive,
a pair of elongated inner and outer splined members sliding one inside the other with splines interlocked,
radial clearance at the roots of the splines of at least one of said members,
and a series of peripheral grooves in one of said members,
the depth of said grooves at least equalling the root depths of the splines,
said grooves being so spaced that the length of the lands between the grooves is less than a predetermined minimum extent of axial differential movement in cycles of the said members so that any given point on said lands will enter at least one of said grooves at every cycle of axial movement,
and means for forcing lubricant into said radial clearances from one end of said splines to keep said grooves filled with fresh lubricant at all times.

4. In a slip joint for a rotary drive,
a pair of elongated inner and outer splined members sliding one inside the other with splines interlocked,
large radial clearance at the roots of the splines of at least one of said members,
and a series of peripheral grooves in one of said members,
the depth of said grooves at least equalling the root depths of the splines,
said grooves being so spaced that the length of the lands between the grooves is less than a predetermined minimum extent of axial differential movement in cycles of the said members so that any given point on said lands will enter at least one of said grooves at every cycle of axial movement,
and a pump for forcing a flow of lubricant into said radial clearances from one end of said splines to keep said grooves filled with fresh lubricant at all times, so that each time said given point on said land enters said groove it will be covered with lubricant.

5. In a slip joint for a rotary drive,
a pair of elongated inner and outer splined members sliding one inside the other with splines interlocked,
large radial clearance at the roots of the splines of at least one of said members,
and a series of peripheral grooves in one of said members,
the depth of said grooves at least equalling the root depths of the splines,
said grooves being so spaced that the length of the lands between the grooves is less than a predetermined minimum extent of axial differential movement in cycles of the said members so that any given point on said lands will enter at least one of said grooves at every cycle of axial movement,
and means for creating a gravity flow of lubricant to said splines whereby gravity forces said lubricant to enter said radial clearances.

6. In a slip joint for a rotary drive,
a pair of elongated inner and outer splined members sliding one inside the other with splines interlocked,
and a series of peripheral grooves in one of said members,
the depth of said grooves at least equalling the root depth of the splines,
said grooves being so spaced that the length of the lands between the grooves is less than a predetermined minimum extent of axial differential movement of the said members.

7. In a mechanism
having a power means connected by a rotary drive means to a vibrating means wherein said vibrating means imparts vibratory movement to said rotary drive means in a direction parallel to the axis of at least part of said drive means,
means for isolating said power means from such vibratory movement, including a splined joint at said part of said means to accommodate such vibratory movement,
said splined joint including a first portion telescopically receiving a second portion,
said portions having alternating splines and channels arranged in interdigitated relation,
said splines and channels providing clearance passageways therebetween for the flow of liquid lubricant therealong,
and means for supplying liquid lubricant to said clearance passages,
at least certain of said splines being interrupted at spaced places lengthwise thereof to provide spline segments between which are exposed the walls of the opposed channels so that the liquid lubricant will coat such wall portions and the coating will serve to lubricate the spline segments as they move onto such portions.

8. The mechanism of claim 7 wherein the means for supplying liquid includes pump means,
and means driven by the power means for drivingly connecting the power means and the pump means.

References Cited by the Examiner

UNITED STATES PATENTS

| | | | |
|---|---|---|---|
| 1,496,236 | 6/24 | Laughlin | 64—23 |
| 1,973,702 | 9/34 | Cooke | 64—23 |
| 2,118,812 | 5/38 | Fageol | 184—27 X |
| 2,248,478 | 7/41 | Mall | 94—50 |
| 2,728,277 | 12/55 | McRae | 94—48 |

MILTON KAUFMAN, *Primary Examiner.*

ROBERT C. RIORDON, *Examiner.*